US009495645B2

(12) United States Patent
Hughes et al.

(10) Patent No.: US 9,495,645 B2
(45) Date of Patent: Nov. 15, 2016

(54) METHOD AND SYSTEM OF ITERATIVELY AUTOTUNING PREDICTION PARAMETERS IN A MEDIA CONTENT RECOMMENDER

(71) Applicant: concept.io, Inc., Cupertino, CA (US)

(72) Inventors: Dominic Hughes, Menlo Park, CA (US); Gurumurthy D. Ramkumar, Palo Alto, CA (US); Georgios Sofianatos, San Francisco, CA (US)

(73) Assignee: concept.io, Inc., Cupertino, CA (US)

( * ) Notice: Subject to any disclaimer, the term of this patent is extended or adjusted under 35 U.S.C. 154(b) by 367 days.

(21) Appl. No.: 13/954,942

(22) Filed: Jul. 30, 2013

(65) Prior Publication Data

US 2015/0058264 A1  Feb. 26, 2015

Related U.S. Application Data

(63) Continuation-in-part of application No. 13/761,420, filed on Feb. 7, 2013.

(60) Provisional application No. 61/716,540, filed on Oct. 21, 2012.

(51) Int. Cl.
    *G06F 15/18*    (2006.01)
    *G06N 99/00*    (2010.01)
    *G06F 17/30*    (2006.01)

(52) U.S. Cl.
    CPC ....... *G06N 99/005* (2013.01); *G06F 17/30766* (2013.01)

(58) Field of Classification Search
    None
    See application file for complete search history.

(56) References Cited

U.S. PATENT DOCUMENTS

| | | | |
|---|---|---|---|
| 6,947,922 B1 * | 9/2005 | Glance | G06F 17/30017 707/999.1 |
| 7,409,336 B2 | 8/2008 | Pak | |
| 8,463,036 B1 | 6/2013 | Ramesh | |

(Continued)

OTHER PUBLICATIONS

Koren, Y. et al. (2011). "Advances in collaborative filtering." Chapter 5 of Recommender systems handbook. Springer US, 2011. 145-186. DOI: 10.1007/978-0-387-85820-3_5.*

(Continued)

*Primary Examiner* — Stanley K Hill
*Assistant Examiner* — Benjamin Buss
(74) *Attorney, Agent, or Firm* — Blank Rome LLP

(57) ABSTRACT

In one exemplary embodiment, a method of a computerized media-content recommender includes receiving a user-judgment score based on an historical user-listening data with respect to a media content. A first prediction score for a user with respect to the media content is calculated with a media-content recommender. The media-content recommender includes a first set of prediction parameters. A first prediction error including a difference between the user-judgment score and the first prediction score is determined. At least one parameter value of the first set of prediction parameters is modified with a machine-learning optimization technique to generate a second set of prediction parameters. A second prediction score for the user with respect to the media content is calculated with a media-content recommender. A second prediction error including a difference between the user-judgment score and the second prediction score is calculated.

20 Claims, 13 Drawing Sheets

(56) References Cited

U.S. PATENT DOCUMENTS

| | | |
|---|---|---|
| 8,538,965 B1 | 9/2013 | Talyansky |
| 8,582,821 B1 | 11/2013 | Feldman |
| 8,644,610 B1 | 2/2014 | Ramkumar |
| 8,733,650 B1 | 5/2014 | Segal |
| 8,738,647 B2 | 5/2014 | Menon |
| 8,756,216 B1 | 6/2014 | Ramesh |
| 8,762,552 B2 | 6/2014 | Ramkumar |
| 8,787,679 B1 | 7/2014 | Ramesh |
| 8,825,612 B1 | 9/2014 | Ruzon |
| 8,943,090 B2 | 1/2015 | Dhua |
| 8,990,199 B1 | 3/2015 | Ramesh |
| 9,104,700 B1 | 8/2015 | Ramkumar |
| 2009/0216741 A1 | 8/2009 | Thrall |
| 2009/0248672 A1 | 10/2009 | McIntire |
| 2010/0030764 A1* | 2/2010 | Koren ............... G06F 17/30029 707/748 |
| 2010/0100516 A1* | 4/2010 | Zhou .................. G06N 5/02 706/46 |
| 2010/0262658 A1 | 10/2010 | Mesnage |
| 2010/0325126 A1* | 12/2010 | Rajaram ............ G06F 17/3053 707/759 |
| 2012/0066618 A1* | 3/2012 | Barker ............... G06F 17/30185 715/753 |
| 2012/0278342 A1 | 11/2012 | Purdy |
| 2013/0159081 A1 | 6/2013 | Shastry |
| 2013/0212178 A1* | 8/2013 | Krishnamurthy ....... H04L 67/02 709/204 |
| 2013/0332965 A1 | 12/2013 | Seyller |
| 2014/0101142 A1* | 4/2014 | Gomez Uribe ... G06F 17/30029 707/723 |
| 2014/0115082 A1* | 4/2014 | Korst .................... H04L 51/046 709/206 |
| 2014/0129500 A1* | 5/2014 | Nice ........................ G06N 5/02 706/46 |
| 2014/0298385 A1* | 10/2014 | Roberts ................ H04N 21/482 725/45 |
| 2014/0358911 A1* | 12/2014 | McCarthy ......... G06F 17/30864 707/723 |
| 2014/0379460 A1* | 12/2014 | Schein ............... G06Q 30/0244 705/14.43 |
| 2015/0074022 A1 | 3/2015 | Cornelius |
| 2015/0141123 A1* | 5/2015 | Callaway ............ G07F 17/3206 463/25 |

OTHER PUBLICATIONS

Solodov, M.V. (1998). "Incremental gradient algorithms with stepsizes bounded away from zero." Computational Optimization and Applications, 11(1), 23-35. DOI: 10.1023/A:1018366000512.*

Rendle, S. (Feb. 2012). "Learning recommender systems with adaptive regularization." Proceedings of the fifth ACM international conference on Web search and data mining. ACM. DOI: 10.1145/2124295.2124313.*

Bell, R.M. et al. (2007). "The BellKor solution to the Netflix prize." 15 pages.*

Flaxman, A.D., et al. (2005). "Online convex optimization in the bandit setting: gradient descent without a gradient." Proceedings of the sixteenth annual ACM-SIAM symposium on Discrete algorithms. Society for Industrial and Applied Mathematics. 10 pages.*

Dror, G. (2012). "Web-scale media recommendation systems." Proceedings of the IEEE, 100(9), 2722-2736. Date of Publication: May 31, 2012. Issue Date: Sep. 2012. DOI:10.1109/JPROC.2012.2189529.*

Ten Hagen, S. et al. (2003). "Exploration/exploitation in adaptive recommender systems." proceedings of Eunite 2003. 37 pages.*

Jiang Fan, Wu Yi-meng, Zhang Zhen-shan, Zhan Wu, "Combinational Seabed Terrain Matching Algorithm Basing on Probability Data Associate Filtering and Iterative Closest Contour Point," Second International Conference on Intelligent Computation Technology and Automation, 2009, ICICTA, vol. 1, pp. 245-249, DOI: 10.1108/ICICTA.2.

Ren Yuyan, Wang Honrui, Bao Jie, "BP Neural Network Based on improved BFGS Algorithm in the Virtual Speed Prediction of Bio-mimetic Robotic Horse," 2010 International Conference on Intelligent Computation Technology and Automation (ICICTA), vol. 1, pp. 887-890, DOI: 10.1109/ICICTA.2010.440.

Sanchez, G., Zatt, B., Porto, M., Agostini, L., "ES&IS: Enhanced Spread and Iterative Search hardware-friendly motion estimation algorithm for the HEVC Standard," IEEE 20th International Conference on Electronics, Circuits, and Systems (ICECS), 2013, pp. 941-944, DOI: 10.1109/ICECS.2013.6815567.

Zhang, Z.G., Chan, S.C., Tsui, K.M., "A Recursive Frequency Estimator Using Linear Prediction and a Kalman-Filter-Based Iterative Algorithm," IEEE Transactions on Circuits and Systems II: Express Briefs, 2008, vol. 55, issue. 6, pp. 576-580, DOI: 10.1109/TCSII.2007.916837, Referenced in IEEE Journals & Magazine.

\* cited by examiner

METHOD AND SYSTEM OF ITERATIVELY AUTOTUNING PREDICTION PARAMETERS IN A MEDIA CONTENT RECOMMENDER

CROSS-REFERENCE TO RELATED APPLICATIONS

This application claims the benefit of and is a continuation-in-part of U.S. application Ser. No. 13/761,420, and filed Feb. 7, 2013, which in turn also claims priority to U.S. patent provisional application No. 61/716,540 filed on Oct. 21, 2012. These applications are incorporated herein by reference.

BACKGROUND

1. Field

This application relates generally to media content, and more specifically to a system, article of manufacture and method for iteratively autotuning prediction parameters in a media content recommender.

2. Related Art

Conventional methods of delivering media for individuals may require substantial user effort to identify potential media content and/or to select media content to access. For example, a user may be required to perform a plurality of searches of the Internet to locate media content of interest. Accordingly, improvements may be made over conventional methods of selecting or delivering media.

BRIEF SUMMARY OF THE INVENTION

In one aspect, a method of a computerized media-content recommender includes receiving a user-judgment score based on a historical user-listening data with respect to a media content. A first prediction score for the user with respect to the media content is calculated with a media-content recommender. The media-content recommender includes a first set of prediction parameters. A first prediction error including a difference between the user-judgment score and the first prediction score is determined. At least one parameter value of the first set of prediction parameters is modified with a machine-learning optimization technique to generate a second set of prediction parameters. A second prediction score for the user with respect to the media content is calculated with a media-content recommender. A second prediction error including a difference between the user-judgment score and the second prediction score is calculated.

Optionally, the machine-learning optimization technique can be a stochastic gradient decent technique. The prediction parameters can include a user-peer parameter, a curated-prior parameter, a user's exploration component parameter, a user-estimate parameter and/or a genre-component parameter.

BRIEF DESCRIPTION OF THE DRAWINGS

The present application can be best understood by reference to the following description taken in conjunction with the accompanying figures, in which like parts may be referred to by like numerals.

Figure 1:
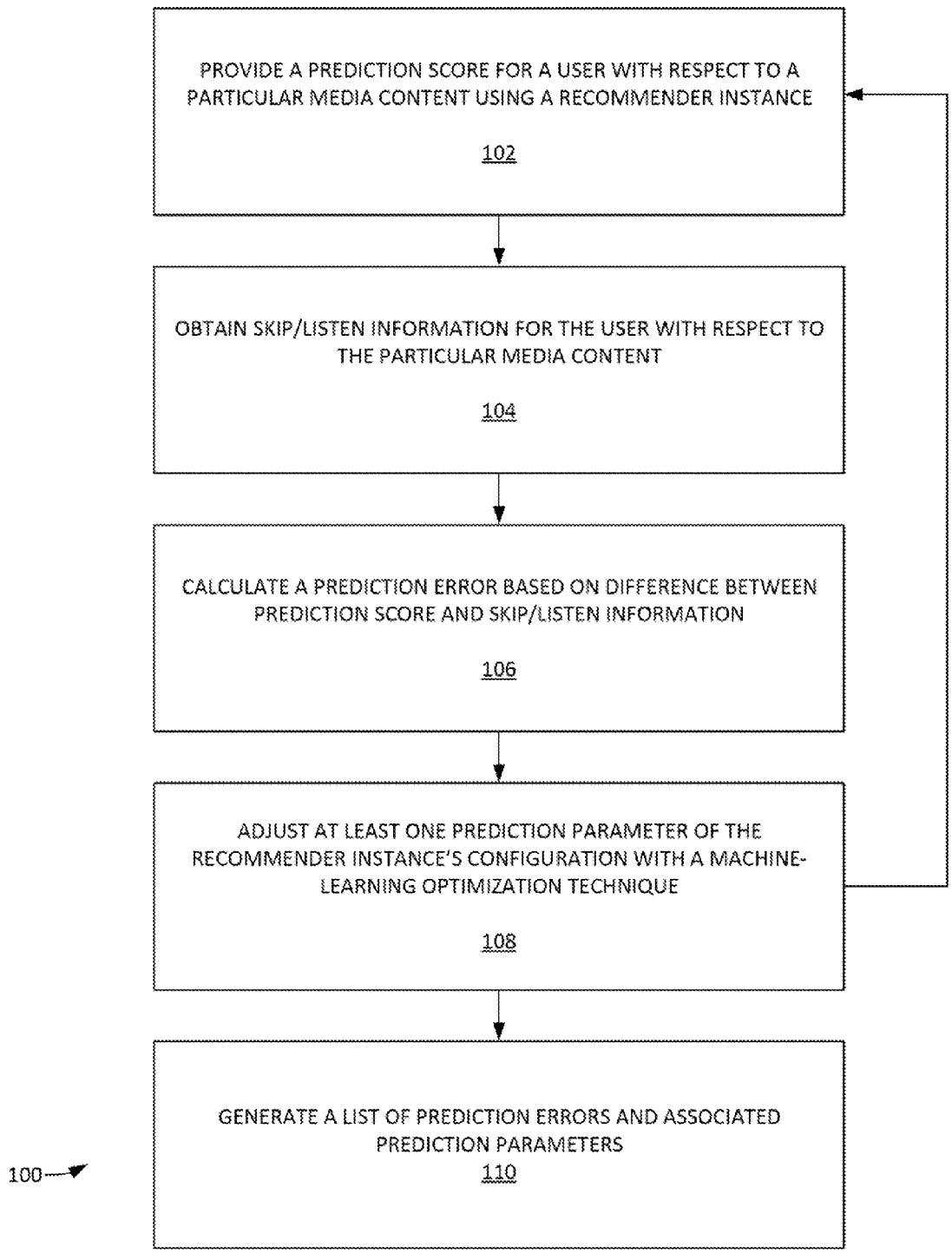
FIG. 1 depicts, in block diagram format, a process of generating to set of prediction errors for a user with respect to a media content, according to some embodiments.

The Figures described above are a representative set, and are not an exhaustive with respect to embodying the invention.

DETAILED DESCRIPTION

Disclosed are a system, method, and article of manufacture for iteratively autotuning prediction parameters in a media content recommender. The following description is presented to enable a person of ordinary skill in the art to make and use the various embodiments. Descriptions of specific devices, techniques, and applications are provided only as examples. Various modifications to the examples described herein may be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary Processes

FIG. 1 depicts, in block diagram format, a process 100 of generating a set of prediction errors for a user with respect to a media content (e.g. a media content episode), according to some embodiments. A prediction error can be the difference in a prediction score (e.g. as provided by a particular configuration of a recommender instance) and a value derived from an analysis of the actual user skip/listen event (e.g. a user judgment) for the media content. User skip/listen events can be scored (e.g. generate a judgment score) based on a percentage of a track of the media content the user listened to and/or otherwise consumed. Example media content sources can include news and information audio/video sources (e.g. NPR®, audio/visual weblogs, podcasts, online educational content (e.g. iTunes® university and the like), traffic reports, weather reports, local news content, etc.). Additionally, metadata information about the recommender instance and/or its various parameters can be stored with the set of prediction errors.

In step 102 of process 100, a prediction score is provided for a user with respect to particular media content using a recommender instance. The recommender instance, can utilize various prediction methodologies such as those provided in the descriptions of FIGS. 2-6, and/or elsewhere herein. The prediction parameters of the recommender instance can be set to a particular configuration. Each particular configuration of prediction parameters can yield a particular prediction score in a simulation. Simulations involving process 100 can be run in parallel and/or in sequence.

In step 104, skip/listen information for a user for the particular media content is obtained. In some examples, the skip/listen information can be converted into a judgment score. It is noted that process 104 can be skipped if process 100 is being repeated for subsequent autotuned recommender instance and the skip/listen information for a user is already available to a recommender instance.

In step 106, a prediction error is calculated based, inter alia, on the difference between the prediction score and the user's skip/listen information. In step 108, at least one prediction parameter of the recommender instance's configuration can be adjusted (e.g. autotuned) based on a machine-learning optimization technique. Simulations including steps 102-108 can be repeated (e.g. for a number of iterations implemented by the particular machine-learning optimization technique being utilized). The set of different prediction scores can be compared with the user skip/listen event information (e.g. with a judgment score derived from the user skip/listen information) to generate a set of prediction errors in step 110. It is noted that various optimization methodologies and techniques can be utilized to adjust prediction parameters for each iteration of the set of different prediction scores. The set of prediction errors can also include associated metadata such as associated prediction parameters, information about media content, etc.

In one example, a personalized media content delivery system can use a smart-phone application to provide a user an episode of the NPR® show Fresh Air®. The prediction score for the user for the episode of Fresh Air® can be 0.78. The user can listen to an amount of the episode that achieves an actual user-judgment score of 0.1. A user-judgment score can be a value derived from user-skip listen information and normalized for comparison with prediction scores. The prediction error would then be valued at 0.6. Certain steps of process 100 (e.g. 102, 106 and 108) can be repeated by autotuning the parameters of the prediction instance used by the recommender to generate another prediction score and subsequent respective prediction errors can be calculated with respect to the episode of Fresh Air®. In this way, a set of prediction errors, each generated by a different prediction parameter configuration in the recommender algorithm, can be provided for each media content episode and/or for each user in a system implementing process 100. For example, a set of recommender configurations can be run for each skip/listen event, for each user of said system and a prediction error collected for each recommender configuration in an historical simulation.

Various prediction parameters can be utilized in a recommender instance, such as, inter alia: collaborative-filtering between peers, curated priors (e.g. initial ratings by administrators of the personalized media content delivery system), user-exploration components, user-estimate components, genre components, historical user skip/listen behavior for program of the media content episode, etc. (and/or any combination thereof) (see process 200 infra for an examples of these and other prediction parameters). One or more recommender instances, each with its own variant values of the prediction parameters, can be generated and used.

As noted, for each iteration of step 108 a machine-learning optimization technique can be applied to modify the prediction parameters. In some embodiments, each prediction parameter can include both a value and a weight. For each simulation, the recommender instance's prediction score can be a weighted average of each pair of prediction-parameter values. In some simulations, the value and/or weight of a prediction-parameter value can decay as a function of another's prediction parameter's value and/or weight. The weight of each prediction parameter can also be modified by the machine-learning optimization technique. Accordingly, the prediction parameters of a recommender instance can be a linear prediction model or a non-linear predication model (e.g. a Bayesian hierarchal prediction model). For example, in a non-linear prediction model, each prediction parameter may contribute equally to the final averaged prediction score as some prediction parameters can be set to contribute more than others. An optimal value of a prediction parameter over other prediction parameters in a recommender instance can be a variable whose value is searched by a machine-learning optimization technique.

Machine-learning optimization methods can be used to 'tweek'/modify each recommender instance. For example, machine-learning optimization methods can be used to automatically search the space of possible recommender instances to determine the one with the lowest cost (see infra). Example machine-learning optimization methods can include, inter alia: combinatorial optimization algorithms, dynamic programming algorithms, evolutionary algorithms, gradient methods, stochastic optimization algorithms and the like.

In some example embodiments, a gradient method is art algorithm to solve problems of the form:

$$\min_{x \in \mathbb{R}^n} f(x).$$

Search directions of a gradient method can be defined by the gradient of the function at the current point. Examples of a gradient method optimization can include the gradient descent optimization and the conjugate gradient optimization. A gradient descent algorithm can be a first-order optimization algorithm. In one example, to find a local minimum of a function (e.g. to find the lowest prediction error) using gradient descent, the recommender algorithm can take steps proportional to the negative of the gradient (and/or of the approximate gradient) of the function at the current point.

Stochastic optimization methods can be optimization methods that generate an use random variables. For stochastic problems, the random variables can appear in the formulation of the optimization problem itself, which involve random objective functions or random constraints, for example. Stochastic optimization methods can also include methods With random iterates. An example stochastic optimization method can use random iterates to solve stochastic problems, combining both meanings of stochastic optimization.

In one example, a stochastic gradient descent algorithm can be applied to auto-time the selected parameters used by the recommender algorithm to generate the prediction score. A stochastic gradient descent algorithm can be a gradient descent optimization method for minimizing an objective function that is written as a sum of differentiable functions.

In some embodiments, optimization algorithms can be used to determine an optimal configuration of prediction parameters associated with the lowest prediction error. These prediction parameters can then in turn be utilized to predict user media-content preferences (e.g. predict a future program estimate) by the personalized media content delivery system. These media content preferences can be provided to the user (e.g. via a media content application in the user's mobile device).

In one embodiment, the lowest prediction error can be defined in terms of cost. The square root of all the sum of the squared prediction errors for a particular recommender instance run on a user's listening timeline can be calculated. This value can be defined as the cost of that particular recommender instance. A cost of all the recommender instances can be determined. A search can be performed in the space of all the recommender instances. The variant configuration of the recommender algorithm with the lowest cost can be determined and used to predict future user media content preferences.

As a matter of implementation, in some embodiments, multiple instances of recommender instances can be spawned in multiple threads implemented in a computer processing system and steps 102-108 for each recommender instance can be run substantially in parallel.

Figure 2:
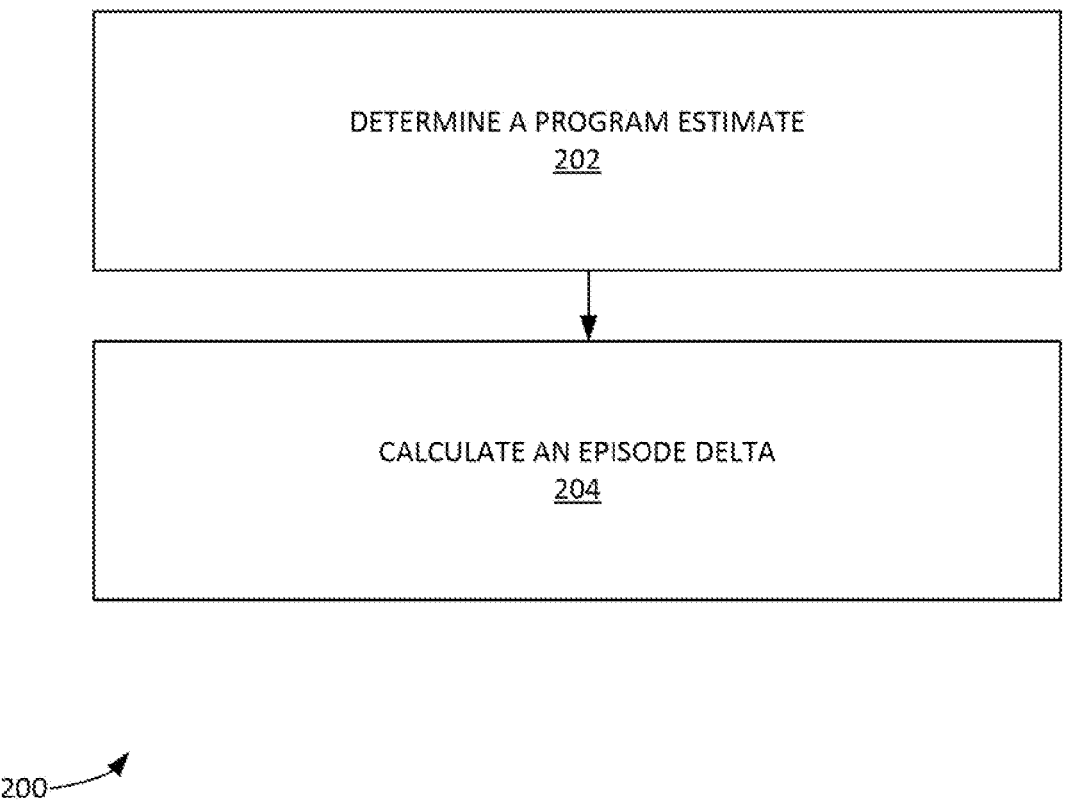
FIG. 2 illustrates an example process of generating a user estimate with respect to a media content episode, according to some embodiments.

FIG. 2 illustrates an example process 200 of generating a user estimate (e.g. a simulated predicted judgment score for a user) with respect to an episode (e.g. a media content episode) associated with a program (e.g. a media content program), according to some embodiments. Process 200 can include determining a program estimate 202. A program estimate can be a predicted user score for a program.

Figure 3:
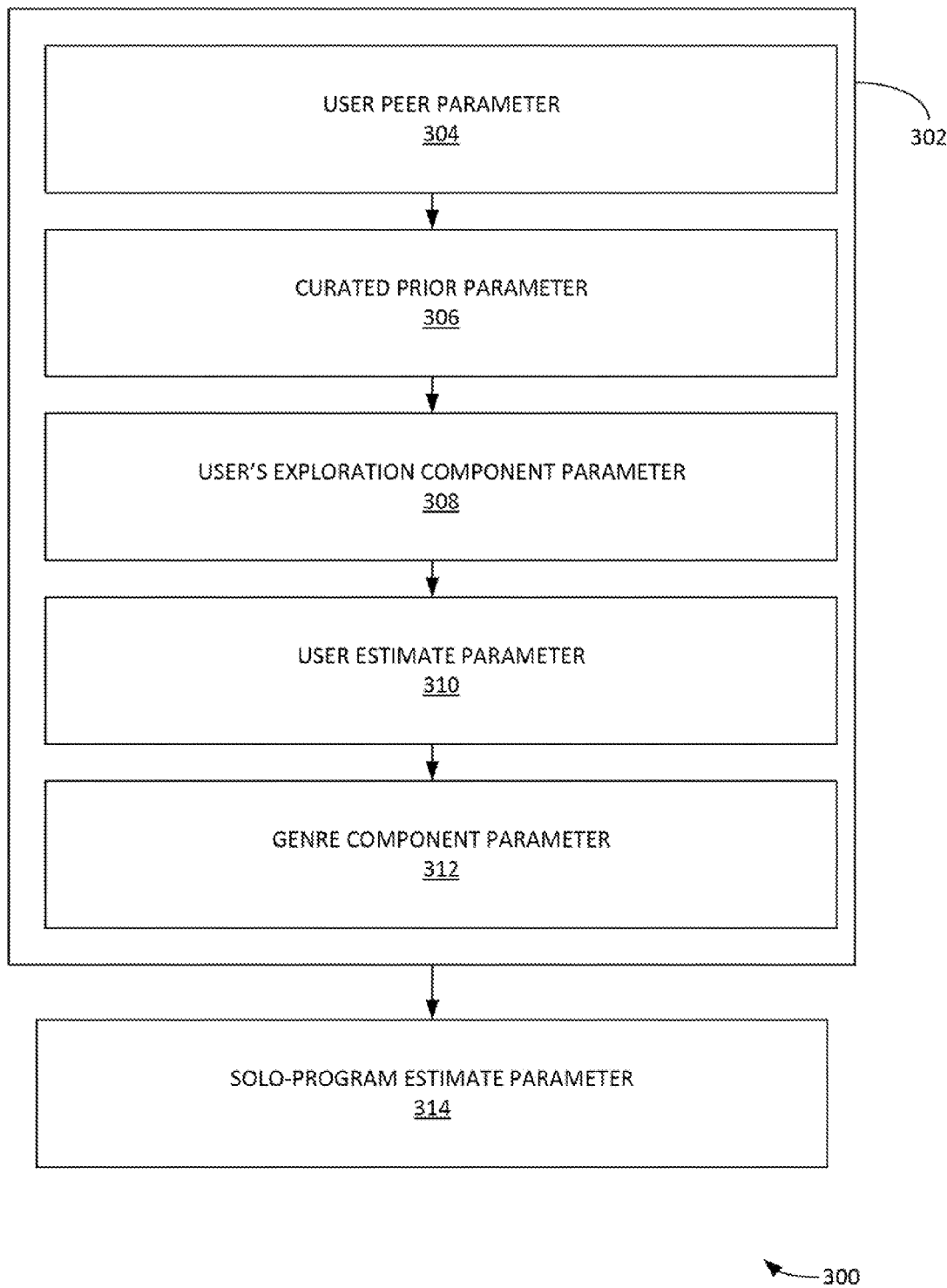
FIG. 3 illustrates an example process for determining a program estimate, according to some embodiments.

FIG. 3 illustrates an example process 300 for determining a program estimate, according to some embodiments. In a first part 302 of process 300, a prior-program estimate value can be determined. For example, in step 304 a user-peer parameter (e.g. with a User Peer Component parameter) can be determined and applied to a program estimate. Step 304 can include one or more collaborative filtering operations. Collaborative filtering operations can include methods of making automatic predictions about the interests of a user by collecting preferences or taste information from other peer users. The relative contribution towards prior program estimate can be governed by the UserPeerRelativeFactor. Process 300 can review a set of users that have judged a program and computes their similarity to the present user. This is accomplished by looking at the programs that both the present user and each user from the set have been served and judged in the past. A close proximity (on average) in their individual normalized judgments reflects a high similarity (positive peers), whereas a high discrepancy represents a low similarity between the pair of users (negative peers). In the case of no overlap, i.e. no programs judged by both users, this results in neutral peers. Positive and neutral peers to the present user can be noted and stored. The number of closest users chosen from the set of users can be set TargetNumPeers. Users determined to be closest users can be weighted more than others users in the set of users according to their similarity to the present user. Other parameters include in step 304 can include, inter alia: PeerDemocratization; NormalizationPadding; and/or SimilarityPadding which smoothens the similarity overlap of users). PeerDemocratization parameter can provide a more equal vote to all peers, by boosting the weight of the contributions from lower-similarity peers. When PeerDemocratization is set to 1, all peers are treated equally independent of their similarity, while when set to 0, no boosting is applied at all. NomalizationPadding can smooth the normalization of the individual user judgments for each program, by introducing an additional weight in their distribution and resulting in smaller volatility. SimilarityPadding can smooth the similarity overlap of users in the set of users, by adding a number of fictitious programs (the "padding") to avoid large variations.

In step 306, a curated-prior parameter (e.g. with a Curated Program Prior Component parameter) can be determined and applied to the peer estimate. Programs in the system can have a curated prior provided by a content manager (e.g. an administrator). The relative contribution towards prior program estimate can governed by the CuratedProgramPriorRelativeFactor parameter.

In step 308, an exploration-component parameter (e.g. an Exploration Component parameter) can be determined. The exploration component can be based on a user's listening activity. A user satisfaction measure can be computed based on the user's listening activity. This information can be used to boost exploration of new programs. For example, the greater a user satisfaction level, the higher the exploration component can be set. This factor can be the same for the user independent of the program. The relative contribution of the exploration-component parameter towards the prior program estimate can be governed by an ExplorationRelativeFactor parameter.

In step 310, a user-estimate parameter (e.g. a User Estimate Component parameter) can be determined. The user-estimate parameter can be based on the user's skip rate and/or average judgment. A relative contribution of the user-estimate parameter towards the prior program estimate can be governed by the UserRelativeFactor parameter. In some examples, older genre judgments can suppressed by multiplying their weight by to factor, such as (1—a UserLearningRate parameter), for each new judgment obtained about a user with respect to a specific program the user consumes. Various learning rates can be applied that determine how a judgment is rated as a function of time. For example, a relatively lower learning rate can treat judgments approximately equally (e.g. values change in weight as a function of time is relatively low). A relatively high learning rate can favor the latest judgments (e.g. values change in weight as a function of time is relatively high). Before a judgment is obtained, the value of the user estimate parameter can be set to a DefaultUserPrior Value parameter with a weight set by a DefaultUserPriorWeight parameter. This default prior user estimate can be mixed (e.g. calculated with a weighted average) with at least one value from a received user judgment with a relative factor equal to PriorUserEstimateFactor parameter.

In step 312, a genre-component parameter (e.g. a Genre Component parameter) can be determined. Each program (e.g., a media content program) can be associated with a genre. A user's previous judgments of other programs from the same genre can be used to generate a genre-component parameter. A relative contribution of the genre-component parameter towards the prior program-estimate parameter can be governed by the GenreRelativeFactor parameter. Various learning rates can be applied that determine how a judgment is rated as a function of time. For example, a relatively lower learning rate can treat user judgments approximately equally (e.g. values change in weight as a function of time is relatively low). A relatively high learning rate can favor the latest user judgments (e.g. values change in weight as a function of time is relatively high). Older genre judgments can be suppressed by multiplying their weight by a factor, such as (1—a GenreLearningRate parameter), for each new user judgment that is obtained. A GenreEstimateTargetWeight parameter value can be used to normalize the weight of genre component parameter to a target value. The weighted judgments can have priors which are either (a) passed in on a per user basis (e.g. derived from the user's Twitter profile) and/or (b) defaulting to the genre component parameter set in the content management database, if the former (e.g. (a)) is not present. If (a) is present then the relative weight of the genre component can be provided by GenrePriorUserCustomizedWeight parameter and if (b) is present, then the relative weight of the genre-component parameter (e.g. a genre prior value) can be determined by the GenrePriorDefaultWeight. The relative contribution of prior program estimate to the program estimate value can be determined by the PriorProgramEstimateFactor parameter.

In step 314, a solo-program estimate parameter (e.g. a Solo Program Estimate parameter) can be determined. The solo program estimate values can be derived from a user's judgments of other episodes of currently evaluated program. The older the judgment, the more its weight is diminished by multiplying by a factor, such as (1—a ProgramLearningRate parameter), for each user judgment. Various learning rates can be applied that determine how a judgment is rated as a function of time. For example, a relatively lower learning rate can treat user judgments in a timeline roughly equally.

Returning now to process 200 of FIG. 2, step 202 can calculate an episode delta (e.g. a deviation of a particular episode from its program estimate). In some example, the episode delta can include a form of episode specific collaborative filtering. Other peer user judgments for all or some specified set of users that have judged the episode can be obtained. The individual differences (e.g. 'deltas') of the peer user judgment from the present user's program estimate (as computed by step 302) can be determined. In one example, a number of fictitious users with zero delta (e.g. a difference value) can be included in the set for smoothing purposes. Their number an be equal to an EpisodeDeltaPadding parameter. To compute an average 'delta value', the contributions of other peer users with program estimates significantly different than that of the present user can be down weighted (e.g. reduced by half for every unit of a EpisodeDeltaNegativeWeightHalfLife parameter). Depending on whether the average delta is a positive or negative value, it can be multiplied by the EpisodeDeltaPositiveFactor parameter or EpisodeDeltaNegativeFactor parameter to produce the episode delta. These various factors and/or parameters provided in the descriptions of process 200 and process 300 can provide different magnitude to episode promotion or demotion.

Each user judgment for an episode can include a value and a weight. The weight can be a measure of confidence in the user judgment. The longer the listening time, the greater the weight of the user judgment. The function that can determine the weight as a function of time listened can be a piecewise linear function with three (3) parameters that determine its shape. A graph of the function can being flat with a weight of JudgmentWeightFunctionStartWeight, and after JudgmentWeightFunctionRamp1StartSec seconds, it can increase up to 1.0 within JudgmentWeightFunctionRamp1WidthSec seconds (see FIGS. 6 A-B infra for additional discussion).

Figure 4:
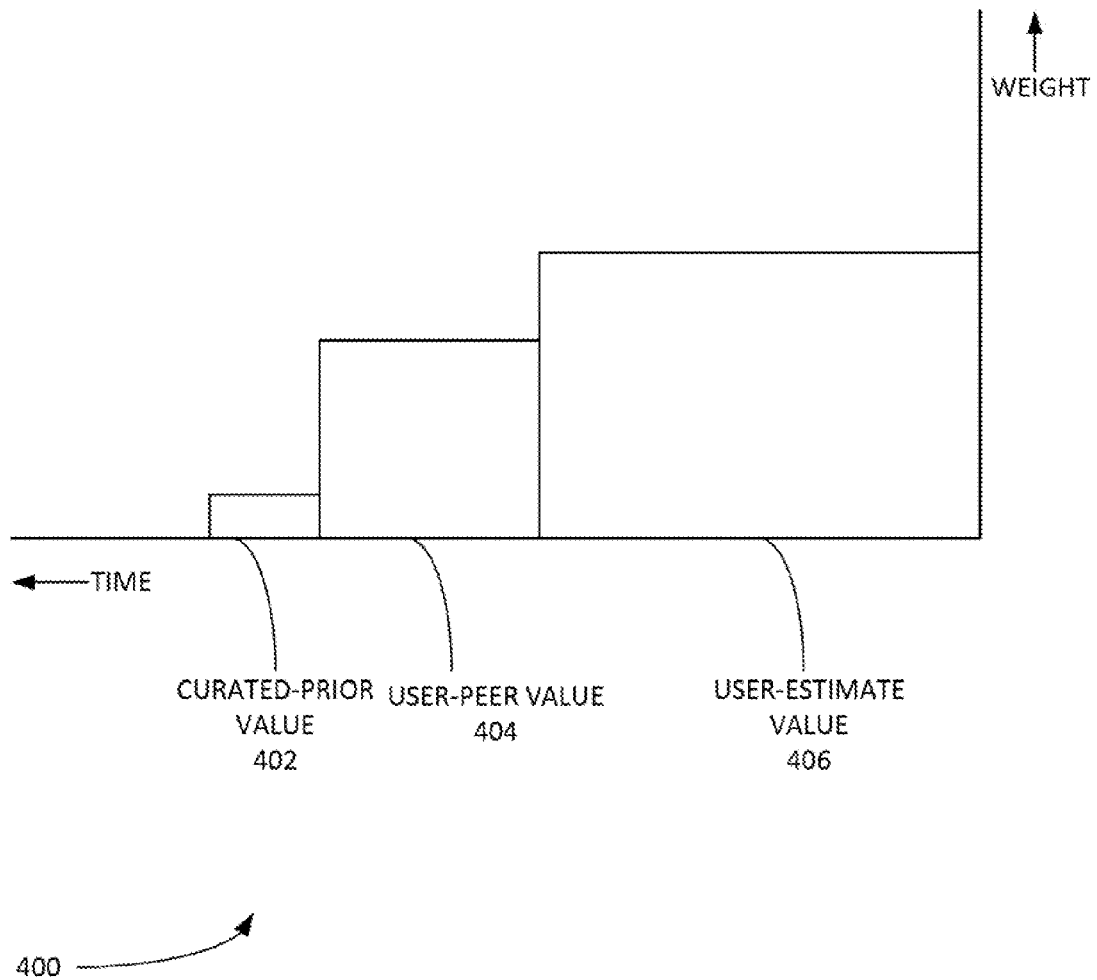
FIG. 4 illustrates, in a histogram format, an example graphical representation of three example prediction parameters in a plot, according to some embodiments.

FIG. 4 illustrates, in a histogram format, an example graphical representation of three example prediction parameters in a plot 400, according to some embodiments. The three example prediction parameters can include a curated-prior value 402, a user-peer value 404 and a user estimate value 406. As noted supra, each prediction parameter can include both a value and a weight. In the example of FIG. 4, plot 400 can include a time axis and a weight axis. The value of each prediction parameter can be graphically depicted by a prediction parameter box length along the time axis. The weight can be graphically depicted by a prediction parameter box height along the weight axis. A hierarchy can be imposed on the properties of the prediction parameter boxes. For example, the properties of each prediction parameter box can vary as a function of such facts as time and/or the value of another prediction parameter.

For each simulation, the recommender algorithm configuration's prediction score can be a weighted average of each pair of prediction parameter values. In some simulations, the value and/or weight of a prediction parameter value can decay as a function of another's prediction parameter's value and/or weight as well as a function of time. For example, the weight of the curated-prior value 402 can decay as more user-peer value 404 information is obtained and/or utilized.

It is noted that the various decay values and/or other attributes of the hierarchy depicted in plot 400 can be modified for each iterative simulation with a recommender algorithm configuration. Machine-learning optimization techniques can be utilized to determine the various decay values and/or other attributes of the hierarchy depicted in plot 400 for each iterative simulation.

Figure 5A:
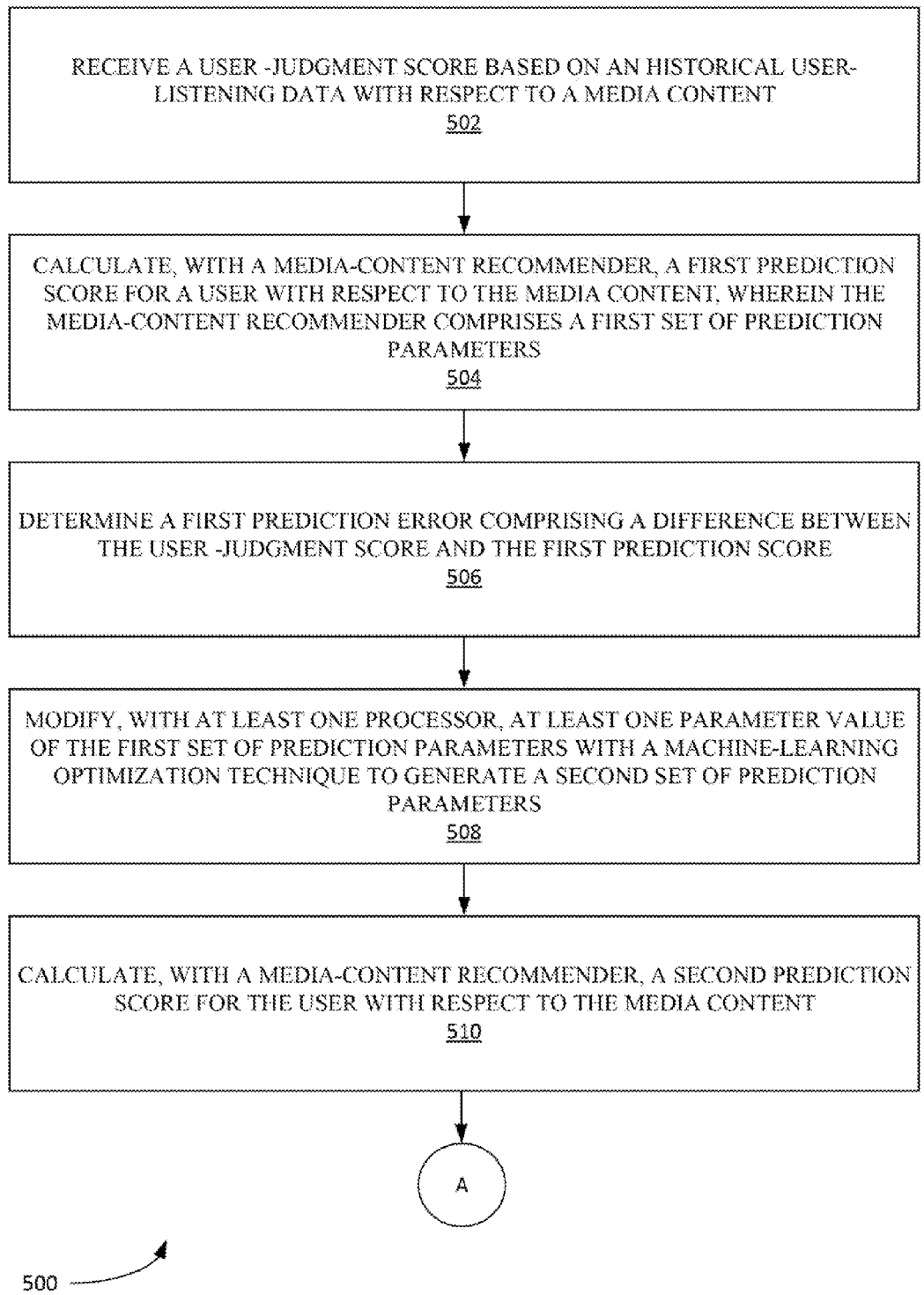
FIGS. 5 A-B illustrate an example process for iteratively autotuning prediction parameters in a media content recommender, according to some embodiments.
Figure 5B:
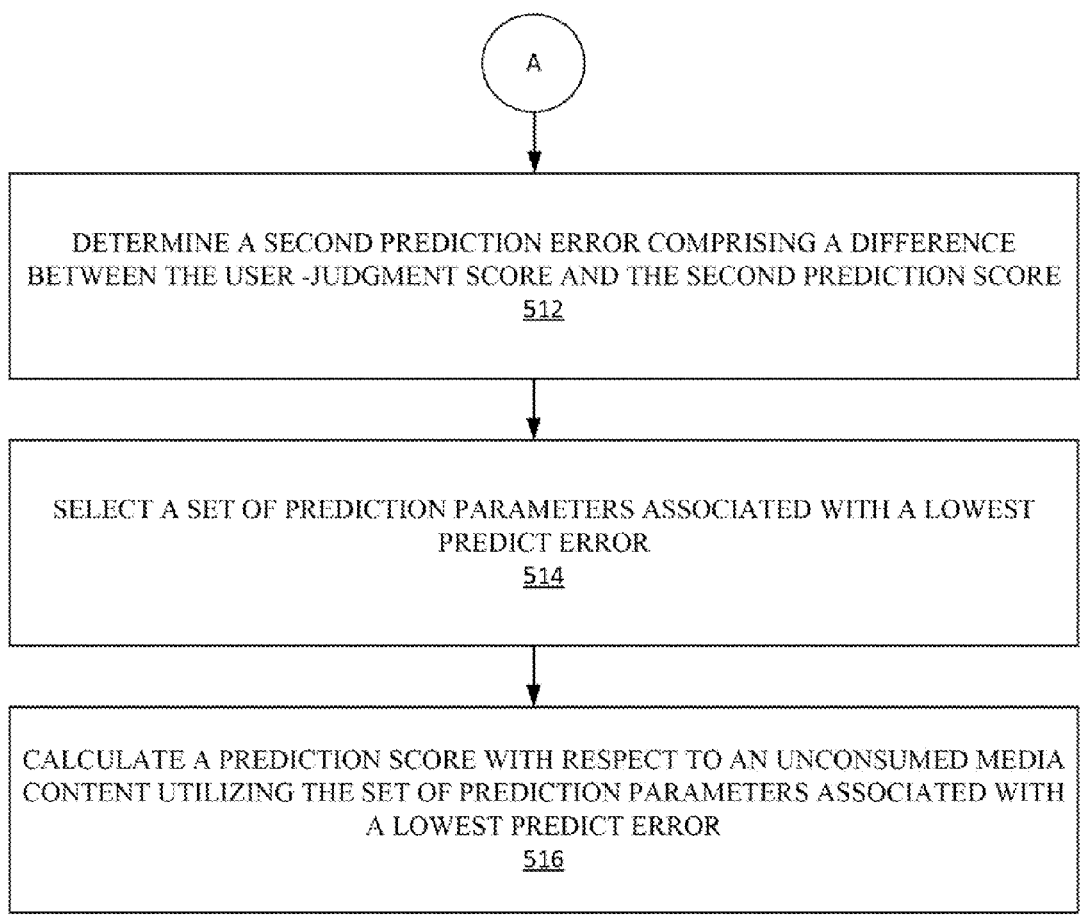

FIGS. 5 A-B illustrate an example process 500 for iteratively autotuning prediction parameters in a media content recommender, according to some embodiments. In step 502, a user-judgment score can be received. The user-judgment score can be based on an historical user-listening data with respect to a media content. In step 504, a first prediction score for a user with respect to the media content can be calculated with a media-content recommender. The media-content recommender can include a first set of prediction parameters. In step 506, a first prediction error including a difference between the user-judgment score and the first prediction score can be determined. In step 508, at least one parameter value of the first set of prediction parameters can be modified with a machine-learning optimization technique to generate a second set of prediction parameters. In step 510, a second prediction score for the user with respect to the media content is calculated with a media-content recommender. In step 512, a second prediction error including a difference between the user-judgment score and the second prediction score is calculated. The machine-learning optimization technique can be a stochastic gradient decent technique. The prediction parameters can include a user-peer parameter, a curated-prior parameter, a user's exploration component parameter, a user-estimate parameter or a genre-component parameter. In step 514, a set of prediction parameters can be selected. The selected set of prediction parameters can be associated with a lowest predict error. In step 516, a prediction score can be calculated with respect to an unconsumed media content utilizing the set of prediction parameters associated with a lowest predict error.

FIGS. 6 A-B depict example graphical representations of various judgment functions that can be utilized to generated a judgment score (e.g. a weighted average judgment score) for a user with respect to a media content (e.g. program or episode), according to some embodiments. As used herein, a program can be a production of at least one or more episodes (e.g. a serialized television, podcast and/or radio program). An episode can be a unit of a serialized program. However, an episode can also be a single audio and/or video production (or even an image in some embodiments), and need not be a unit of a serialized program (e.g. a single recording of a famous speech and/or other event). Examples of programs include Talk of the Nation®, Fresh Air®, the News Hour®, This American Life® and the like.

Figure 6A:
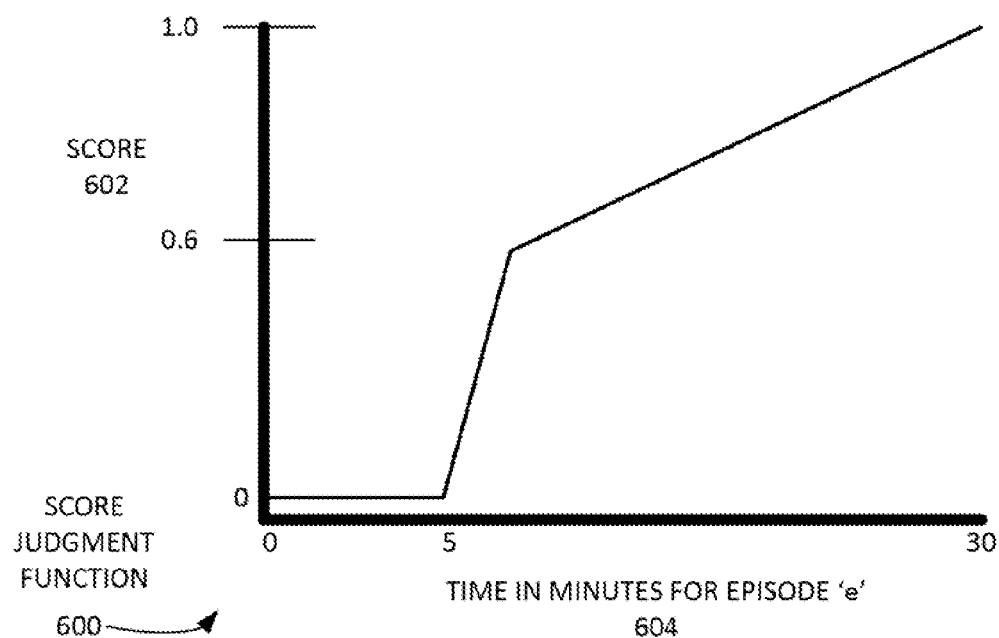
FIGS. 6 A-B depict example graphical representations of various judgment functions, according to some embodiments.

FIG. 6A depicts a graphical representation of an example score judgment function 600, according to some embodiments. Score judgment function 600 can relate a score 602 (e.g. a judgment score) with the time a user consumed a particular episode of media content (in this example media content 'e'). In this way, score 602 can vary as a function of time. For example, score can increase from a minimum of zero (0) to one (1) for the period of an associated media-content episode. The entire period of media content 'e' can be thirty (30) minutes. Score judgment function 600 can be algorithmically preset for each episode of media content. In this particular example, score 602 can have a value of zero for the first five (5) minutes. At five minutes, score 602 can begin to increase at a specified slope to a value of 0.6 at which point the slope again increases until a score of one is reached at thirty minutes. In this way, if a user skips past media content episode 'e' before five minutes, the score is zero. If the user consumes all thirty minutes of media content episode 'e', the score is one. It is noted that score judgment function 600 is provided for exemplary purposes and other score judgment functions can be utilized in various other embodiments.

Figure 6B:

FIG. 6B depicts a graphical representation of an example weight judgment function 606, according to some embodiments. The weight 608 value varies from 0.1 to one and relates to the amount of time the user consumes media content episode 'e'. In this particular example, weight value 608 can increase with a constant slope. It is noted that weight judgment function 606 is provided for exemplary purposes and other weight judgment functions can be utilized, in various other embodiments.

Score 602 can indicate a users level of interest in the episode. This can also imply an interest in a serialized program of which the episode is a part. Weight value 608 can indicate the weight the score judgment carries. A judgment can be calculated from score 602 and weight value 608. The weight can be higher if the user consumes content for longer and weight can be lower if the user consumes content for a lower period of time. Thus, the longer a user consumes an episode the greater the score can grow and the greater the weight that score can have in the scoring of other media content episodes in the same program.

Exemplary Environment and Architecture

Figure 7:
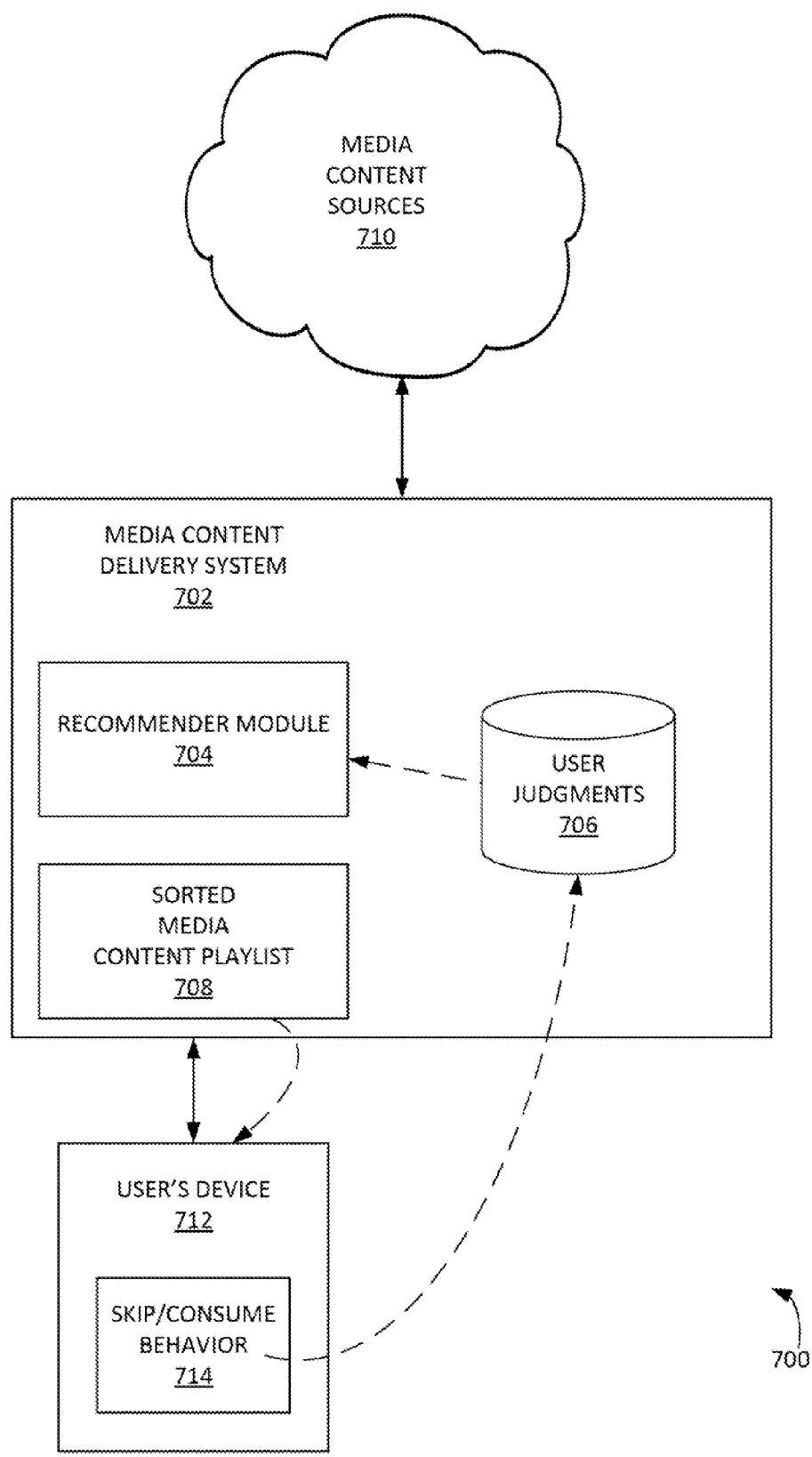
FIG. 7 depicts, in block diagram format, an example system for personalized delivery of media content, according to some embodiments.

FIG. 7 depicts, in block diagram format, an example system 700 for personalized delivery of media content, according to some embodiments. System 700 includes media-content delivery system 702. Media-content delivery system 702 can obtain data from various sources such as media content sources 710, a user's device 712 (e.g. a tablet computer, a smart phone, a head-mounted computing system, etc.). Media-content delivery system 702 can utilize this data to score and/or rank media content based on various factors such as a user's skip/consume behavior 714 with respect to already provided media content, user judgments 706 (e.g. scored and weighted values derived from user's skip/consume behavior 714), prediction analysis of simulations of user behavior (e.g. as performed by recommender module 706), and the like. It is noted that media-content delivery system 702 may not store the media content itself. Rather, media-content delivery system 702 can provide pointer data to media content sources in a sorted media content playlist 708.

Recommender module 704 can perform various prediction analysis techniques to determine the content and/or ranking of media content playlist 708. Recommender module 704 can iteratively perform simulations of user skip/listening behavior and autotune the prediction parameters of the simulations based on various machine-leaning optimization techniques. Recommender module 704 can obtain user judgments 706. Recommender module 704 can determine one or more 'best' prediction parameters for a user by comparing simulation outcomes with user judgments 706 (e.g. prediction parameters that provided a lowest cost in a simulation). These 'best' prediction parameters can then be utilized in determining the content and/or ranking of media content playlist 708. For example, recommender module 704 can perform processes 100, 200 and 300 as well as other functionalities and/or processes provided in FIGS. 4, 5 A-B and 6 A-B to determine the content and/or ranking of media content playlist 708. In this way, media content playlist 708 can be dynamically generated and/or sorted with media content the user is more likely to consume to completion appearing before media content the user is less likely to consume to completion. In some embodiments, system 700 can be implemented in a server environment. In some embodiments, system 700 can be implemented in a cloud-computing environment.

Figure 8:
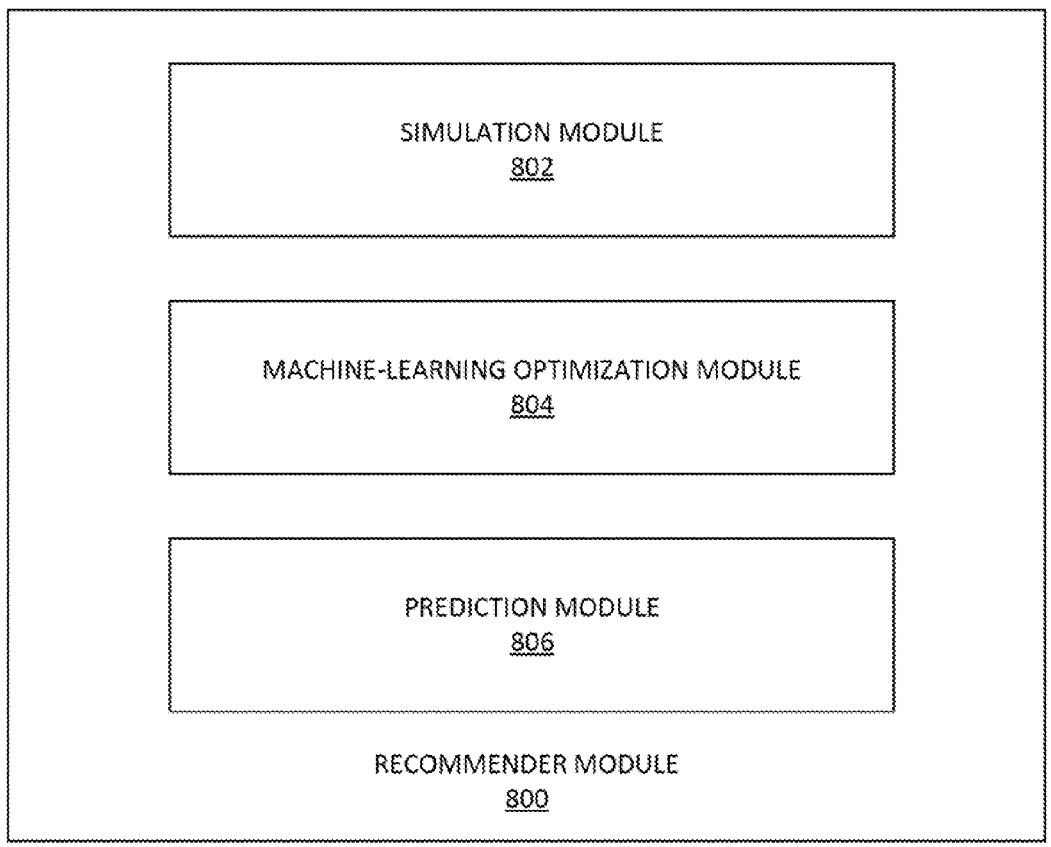
FIG. 8 illustrates, in block diagram format, an example recommender module, according to some embodiments.

FIG. 8 illustrates, in block diagram format, an example recommender module 800, according to some embodiments. Simulation module 802 can perform a set of simulations of a user's skip/listen behavior with respect a particular media content. Simulation module 802 can use a particular prediction parameter configuration for each simulation. Machine-learning optimization module 804 can utilize machine-learning optimization methods (e.g. a stochastic gradient decent method) to configure the prediction parameter values of each simulation. Simulation module 802 can compare a simulation's prediction score with historical user Skip/listen behavior and calculate a prediction error for the simulation. Prediction errors can be utilized to determine a prediction parameter configuration with a lowest cost. Accordingly, prediction module 806 can utilize the prediction errors to select a certain set of prediction parameters and utilize the set of prediction parameters to predict future user skip/listen behavior, user media content preferences, and the like. This information can be used to select and/or sort future media content for the user.

Figure 9:
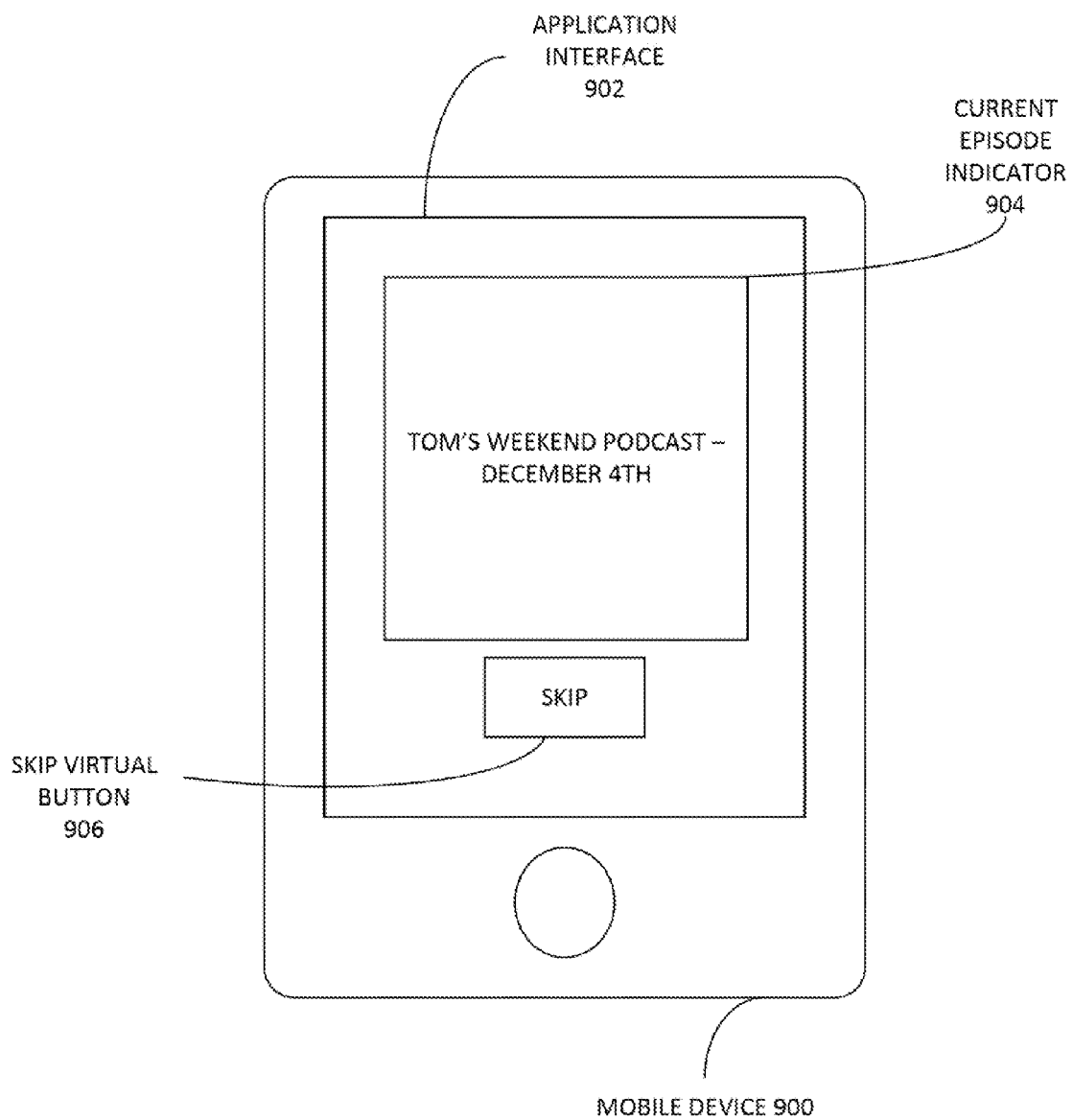
FIG. 9 illustrates an example of a mobile device displaying a media content application interface on a user device, according to some embodiments.

FIG. 9 illustrates an example of a mobile device displaying a media content application interface on a user device, according to some embodiments. Media content application can be a client application of a personalized media content provider (e.g. operating on a server(s) and/or in a cloud-computing environment). Interface 902 can indicate a current episode with a current episode indicator 904 element. Current episode indicator 904 can provide graphical and/or text information about the current episode being played. In some examples, current episode indicator 904 can further provide additional elements such as hyperlinks to the original media content providers and/or additional information about the current media-content episode. A user can skip the remaining media content episode by touching the virtual skip button 906. A next media content episode in a sorted playlist associated with the user can then be played. Information about the next media content episode can be provided in interface 902. User skip/listen information and/or length of time user consumed an episode can be provided to a system server (e.g. media content delivery system 702). The system server can utilize this information to score media content in the user's playlist and subsequently re-sort the playlist as well as include new media content.

Figure 10:
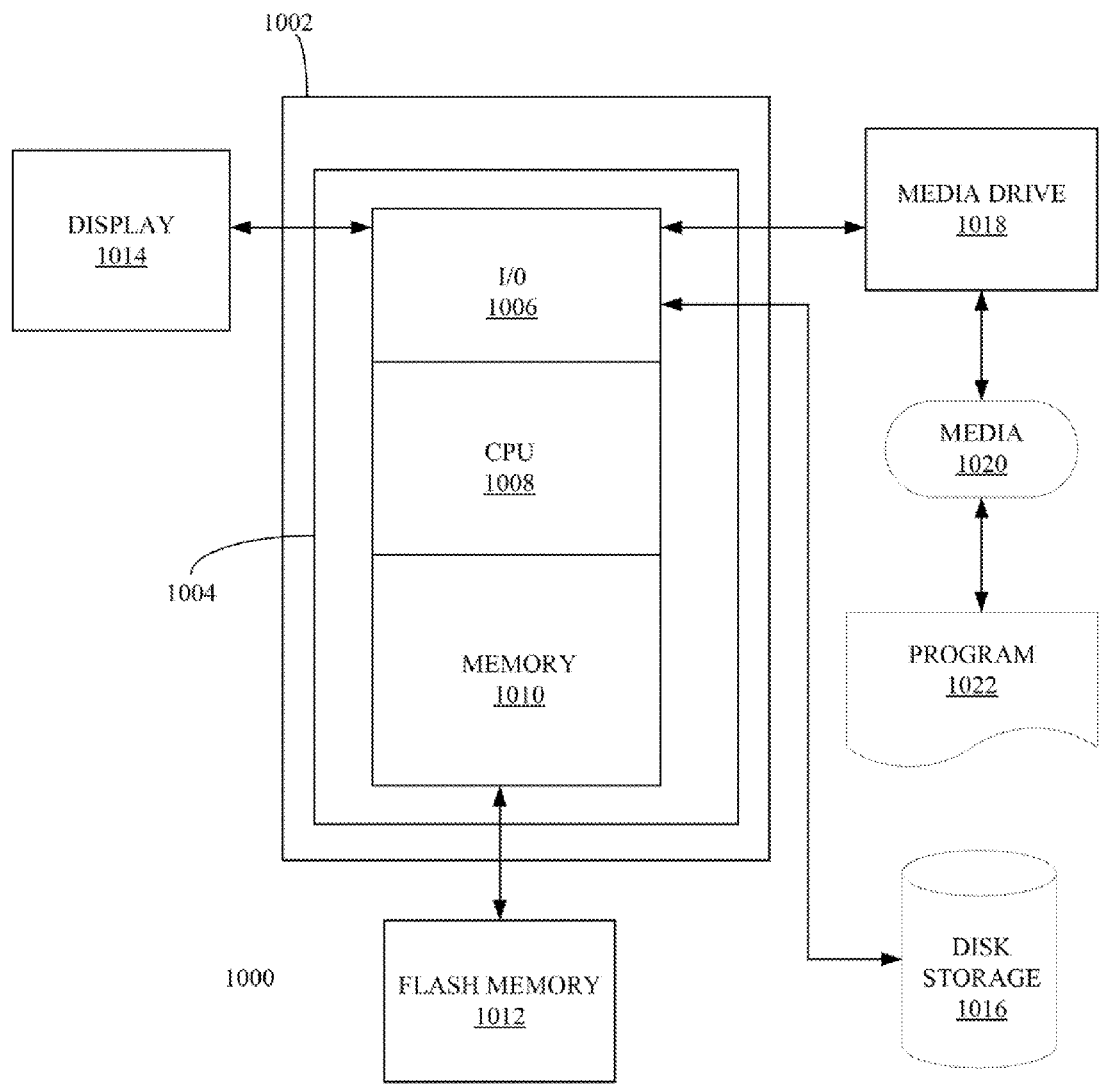
FIG. 10 depicts an exemplary computing system that can be configured perform several of the processes provided herein.

FIG. 10 depicts an exemplary computing system 1000 that can be configured to perform several of the processes provided herein. In this context, computing system 1000 can include, for example, a processor, memory, storage, and I/O devices (e.g., monitor, keyboard, disk drive, Internet connection, etc.). However, computing system 1000 can include circuitry or other specialized hardware for carrying out some or all aspects of the processes. In some operational settings, computing system 1000 can be configured as a system that includes one or more units, each of which is configured to carry out some aspects of the processes either in software, hardware, or some combination thereof.

FIG. 10 depicts a computing system 1000 with a number of components that can be used to perform any of the processes described herein. The main system 1002 includes a motherboard 1004 having an I/O section 1006, one or more central processing units (CPU) 1008, and a memory section 1010, which can have a flash memory card 1012 related to it. The I/O section 1006 can be connected to a display 1014, a keyboard and/or other attendee input (not shown), a disk storage unit 1016, and a media drive unit 1018. The media drive unit 1018 can read/write a computer-readable medium 1020, which can include programs 1022 and/or data. Computing system 1000 can include a web browser. Moreover, it is noted that computing system 1000 can be configured to include additional systems in order to fulfill various functionalities. Display 1014 can include a touch-screen system. In some embodiments, system 1000 can be included in and/or be utilized by the various systems and/or methods described herein. As used herein, a value judgment can refer to a judgment based upon a particular set of values or on a particular value system.

Figure 11:
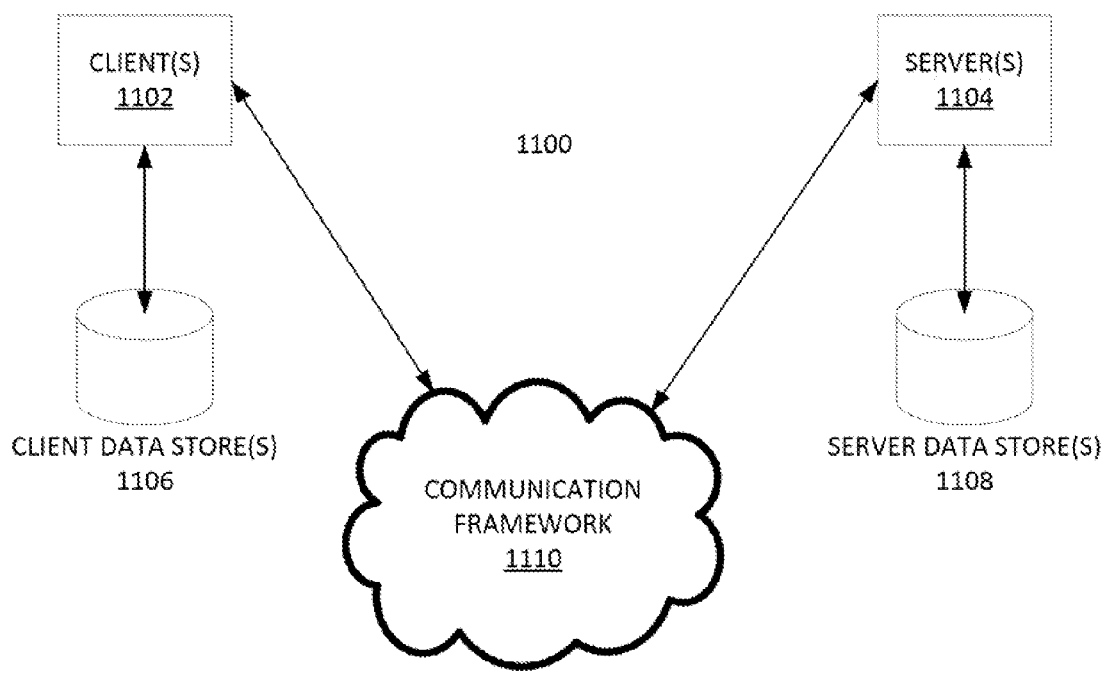
FIG. 11 illustrates a sample computing environment which can be utilized in some embodiments.

FIG. 11 illustrates a sample computing environment 1100 which can be utilized in some embodiments. The system 1100 further illustrates a system that includes one or more client(s) 1102. The client(s) 1102 can be hardware and/or software (e.g., threads, processes, computing devices). The system 1100 also includes one or more server(s) 1104. The server(s) 1104 can also be hardware and/or software (e.g., threads, processes, computing devices). One possible communication between a client 1102 and a server 1104 may be in the form of a data packet adapted to be transmitted between two or more computer processes. The system 1100 includes a communication framework 1110 that can be employed to facilitate communications between the client(s) 1102 and the server(s) 1104. The client(s) 1102 are connected to one or more client data store(s) 1106 that can be employed to store information local to the client(s) 1102. Similarly the server(s) 1104 are connected to one or more server data store(s) 1108 that can be employed to store information local to the server(s) 1104.

Figure 12:
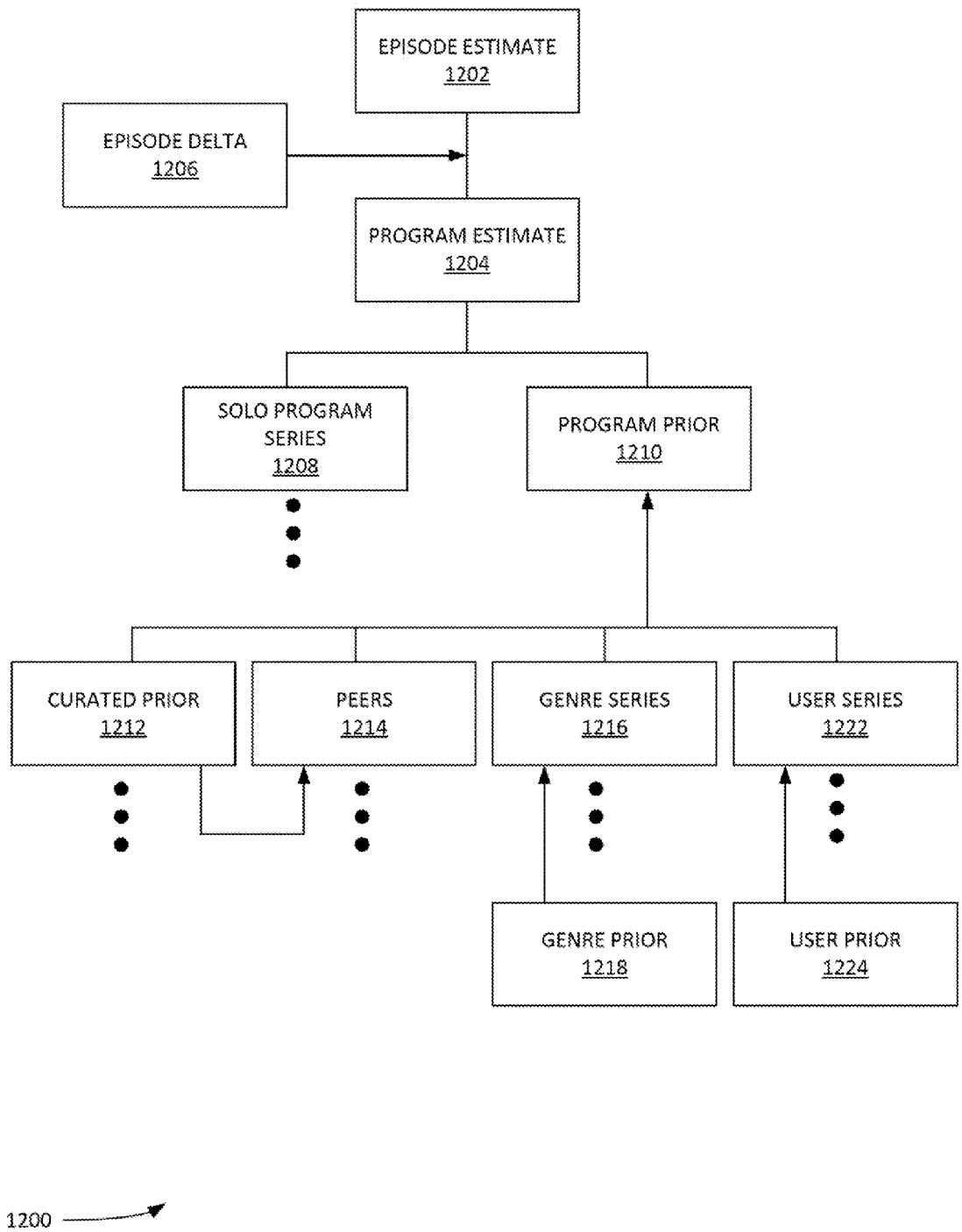
FIG. 12 depicts a tree structure of a system for iteratively autotuning prediction parameters in a media content recommender, according to some embodiments.

FIG. 12 depicts a tree structure 1200 of a system for iteratively autotuning prediction parameters in a media content recommender, according to some embodiments. An episode estimate 1202 comprises a score for an episode of media content (e.g. a pointer to an episode media content file). Episode estimate 1202 can be based on a program estimate 1204 and/or an episode delta 1206. As used herein, a program can be a production of at least one or more episodes (e.g. a serialized television, podcast and/or radio program). As used in FIG. 12, ellipsis can indicate a temporal series of time-decaying scores for the particular node. The rate of time decay (e.g. can be an exponential decay) can be a configurable attribute of the system that is set according to various factors such as administrator input, user information, user behavior, etc. In this way, more recent scores can carry greater weight than earlier scores. The nodes of tree structure 1200 can be represented mathematically. Each node in tree structure 1200 can carry a value and a weight. The weight can represent a confidence in the value. If a plurality of nodes is used to calculate the value of another node, the value can be a weighted average of these nodes values.

Episode delta 1206 can be a score to be factored into episode estimate 1202 based on a collaborative filtering process. For example, a set of users can consume a particular episode of a podcast. An expected score (e.g. an expected weighted average judgment) can be generated for each user (e.g. using each user's historical consumption data). Expected score can be an average of judgments of the user for that program, weighted by time decay, and judgments of other users. As each user consumes the episode, an actual score (e.g. an actual weighted average judgment) can be generated based on the user's behavior. The difference (e.g. the 'delta') between the expected and actual score can be determined for each user. These scores can be averaged to determine the 'episode delta' score for the episode. Media content episodes with higher episode delta values can be 'pushed higher' in a user's sorted media playlist. In this way, a user can be exposed to media content that her peers found interesting.

Program estimate 1204 can be a score for the program that includes the episode of episode estimate 1202. A program estimate 1204 can be determined for each user for each program. Program estimate 1204 can be on various factors such as the two branches of tree structure 1200 for solo program series 1208 and program prior 1210.

Solo program series 1208 (e.g. a solo judgment) can be a scored based on previous user interactions e.g. listen events, skip events, etc.). Solo program series 1206 can be zero if the user has no previous interactions with the program. As more user interaction with a program are obtained, the solo program series 1208 can dominate program prior 1210. Program prior 1210 can be a score based on factors other than user action with the program.

Program prior 1210 can be based on the four nodes: curated prior 1212, peers 1214, genre series 1216 and/or user series 1222. Curated prior 1212 can be a scored provided by a content manager. Curated prior 1212 can be uniform for all users. Peers 1214 can be a scored derived from other user peer (e.g. other users with similar attributes) behavior. Peers 1214 can be based on collaborative filtering techniques (e.g. such as those provide supra). If no peers are determined for a user, than a curated prior score can be used. This curated prior score can be set by a content manager and/or other system administrator as with curated prior 1212.

Genre series 1216 can be a genre-based score for the particular genre(s) that include the program (e.g. a business genre, a science genre, an entertainment, genre, etc.). Genres that a particular user listened to longer can receive higher scores and thus program prior 1210 scores for programs in those genres can receive higher scores accordingly. Genre series 1216 can be determined from user listen/skip events for the particular genre. If a user has no listen/skip events for a particular genre, than the genre series 1216 score can be derived from genre prior 1218. Genre prior 1218 can be derived a curator prior (e.g. no social networking profile available for the user) and/or based on information mined from a user's various social networking profiles (e.g. Twitter tag clouds from information extracted from a user's tweets, from a user's Twitter contact's tweets, topic tag cloud, etc.). User series 1222 (e.g. a user type) can be a global measure of a user's profile in terms of the user's propensity to listen to or skip through various programs. For example, a user that tends to listen through all the programs provide can have a relatively high user series 1222 score due to the fact that a skip event being an anomaly. Conversely, a user can have a tendency to skip through programs. This user can receive a relatively low user series 1222 score due to the normative nature of skip events for the user. User series 1222 score can be an average of all the judgments a user has made. This score can be included in the program prior 1210 score.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software e.g., embodied in a machine-readable medium).

In addition, it may be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method of a computerized media-content recommender comprising:
  receiving a user-judgement score for a user based on historical data regarding the user's consumption of a media content;
  determining, by a media-content recommender, a first prediction score for the user with respect to the media content using a first set of prediction parameters;
  determining a first prediction error comprising a difference between the user-judgment score and the first prediction score for the user and the media content;
  modifying, by at least one processor, at least one parameter value of the first set of prediction parameters with a machine-learning optimization technique to generate a second set of prediction parameters;
  determining, by the media-content recommender, a second prediction score for the user with respect to the media content using the second set of prediction parameters;
  determining a second prediction error comprising a difference between the user-judgment score and the second prediction score;
  identifying a lowest prediction error from the first and second prediction errors;
  selecting that set of prediction parameters corresponding to the lowest prediction error; and
  determining, for the user, a prediction score for an unconsumed media content utilizing the selected set of prediction parameters.

2. The method of claim 1, wherein the machine-learning optimization technique comprises a stochastic gradient descent technique.

3. The method of claim 2, wherein the stochastic gradient descent technique comprises a gradient descent optimization method for minimizing an objective function that is written as a sum of differentiable functions.

4. The method of claim 3, wherein the first set of prediction parameters comprises a user-peer parameter, a curated-prior parameter and a user's exploration component parameter.

5. The method of claim 4, wherein the first set of prediction parameters further comprises a user-estimate parameter and a genre-component parameter.

6. The method of claim 5, wherein each prediction parameter comprises a value and a value weight.

7. The method of claim 6, wherein the first set of prediction parameters is hierarchically weighted, wherein the at least one parameter value comprises the value weight, and wherein modifying at least one parameter value of the first set of parameter values comprises modifying the value weight based on the stochastic gradient descent technique.

8. The method of claim 1, wherein the historical data comprises a time length of the media content and a time length that the user consumed the media content.

9. The method of claim 1, wherein the first prediction score comprises a simulated user-judgment score.

10. A computerized media-content recommender system comprising:
a processor; and
a memory containing instructions which, when executed by the processor, cause the processor to:
receive a user-judgement score for a user based on historical data regarding the user's consumption of a media content;
determine, by a media-content recommender, a first prediction score for the user with respect to the media content using a first set of prediction parameters;
determine a first prediction error comprising a difference between the user-judgment score and the first prediction score for the user and the media content;
modify, by at least one processor, at least one parameter value of the first set of prediction parameters with a machine-learning optimization technique to generate a second set of prediction parameters;
determine by the media-content recommender, a second prediction score for the user with respect to the media content using the second set of prediction parameters;
determine a second prediction error comprising a difference between the user-judgment score and the second prediction score;
identify a lowest prediction error from the first and second prediction errors;
select that set of prediction parameters corresponding to the lowest prediction error; and
determine, for the user, a prediction score for an unconsumed media content utilizing the selected set of prediction parameters.

11. The computerized media-content recommender system of claim 10, wherein the machine-learning optimization technique comprises a stochastic gradient descent technique.

12. The computerized media-content recommender system of claim 11, wherein the first set of prediction parameters comprises a user-peer parameter, a curated-prior parameter, a user's exploration component parameter, a user-estimate parameter and a genre-component parameter.

13. The computerized media-content recommender system of claim 12, wherein the first set of prediction parameters is hierarchically weighted, wherein the at least one parameter value comprises the value weight, and wherein modifying at least one parameter value of the first set of parameter values comprises modifying the value weight based on the stochastic gradient descent technique.

14. The computerized media-content recommender system of claim 12, wherein a specified prediction parameter's weight decays as a function of a specified time value.

15. A non-transitory computer readable medium comprising computer readable code which, when executed by a processor, causes the processor to:
receive a user-judgement score for a user based on historical data regarding the user's consumption of a media content;
determine, by a media-content recommender, a first prediction score for the user with respect to the media content using a first set of prediction parameters;
determine a first prediction error comprising a difference between the user-judgment score and the first prediction score for the user and the media content;
modify, by at least one processor, at least one parameter value of the first set of prediction parameters with a machine-learning optimization technique to generate a second set of prediction parameters;
determine, by the media-content recommender, a second prediction score for the user with respect to the media content using the second set of prediction parameters;
determine a second prediction error comprising a difference between the user-judgment score and the second prediction score;
identify a lowest prediction error from the first and second prediction errors;
select that set of prediction parameters corresponding to the lowest prediction error; and
determine, for the user, a prediction score for an unconsumed media content utilizing the selected set of prediction parameters.

16. The computer-readable medium of claim 15, wherein the machine-learning optimization technique comprises a stochastic gradient descent technique.

17. The computer-readable medium of claim 16, wherein the first set of prediction parameters comprises a user-peer parameter, a curated-prior parameter, a user's exploration component parameter, a user-estimate parameter and a genre-component parameter.

18. The computer-readable medium of claim 17, wherein the first set of prediction parameters is hierarchically weighted, wherein the at least one parameter value comprises the value weight, and wherein modifying at least one parameter value of the first set of parameter values comprises modifying the value weight based on the stochastic gradient descent technique.

19. The computer-readable medium of claim 18, wherein a specified prediction parameter's weight decays as a function of a specified time value.

20. The computer-readable medium of claim 15, wherein the historical data comprises a time length of the media content and a time length that the user consumed the media content.

* * * * *